Patented Sept. 12, 1944

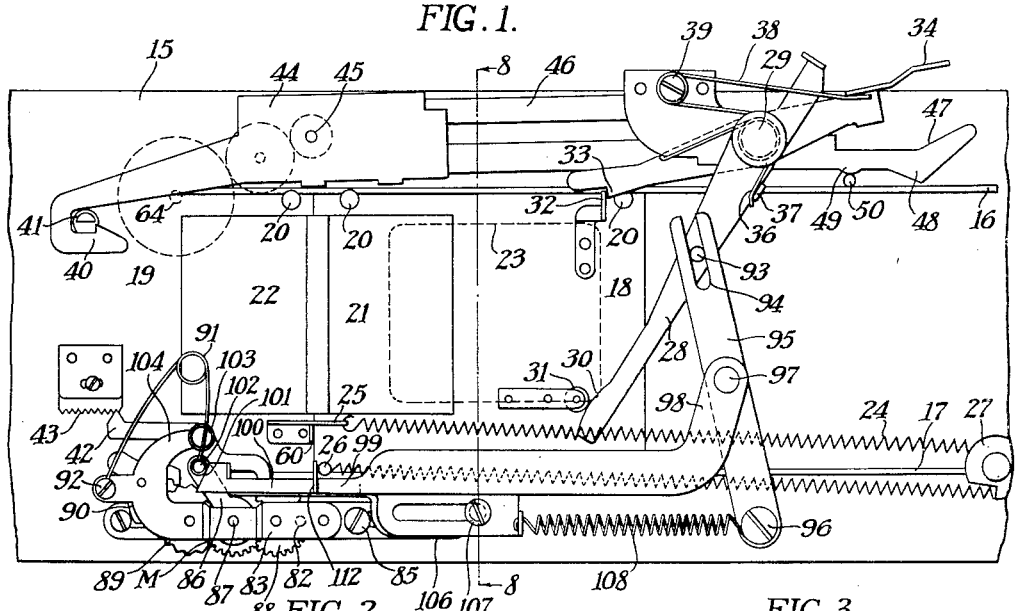

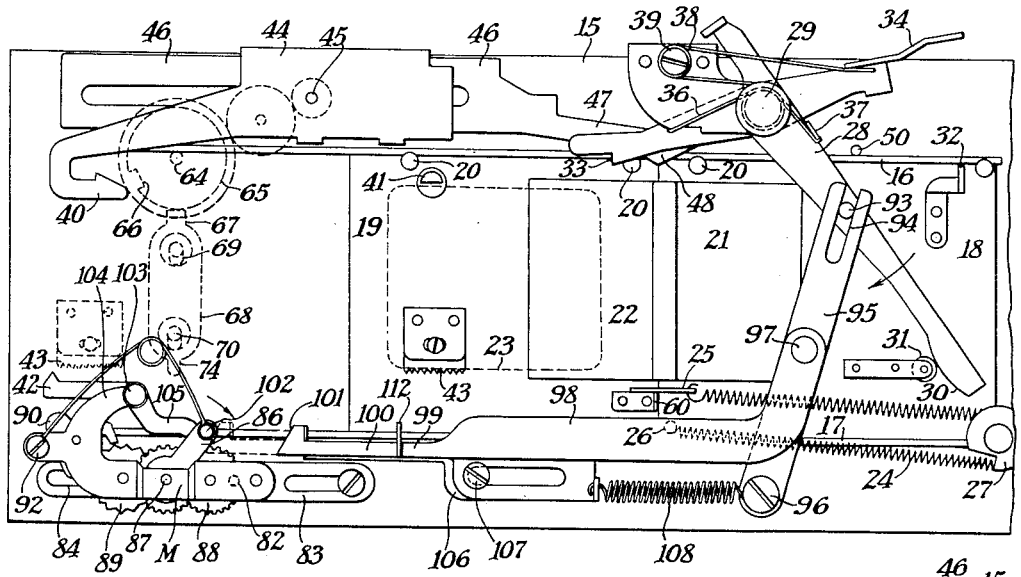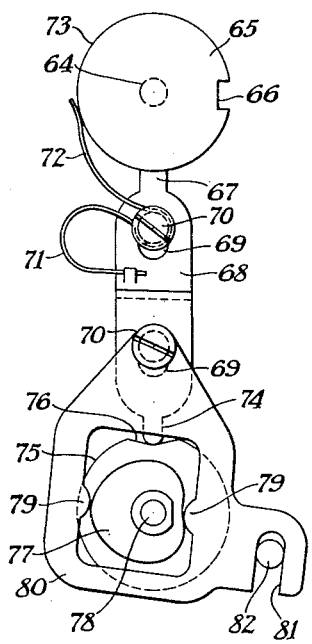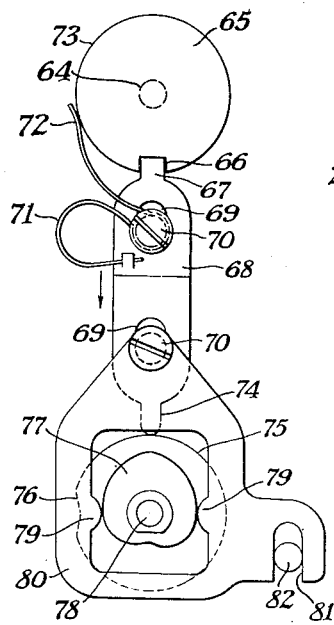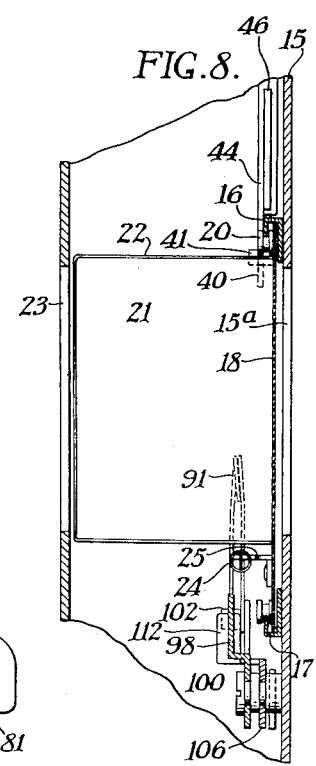

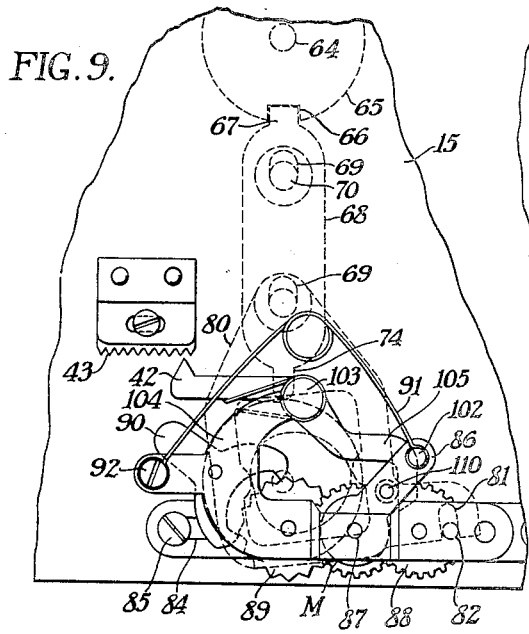
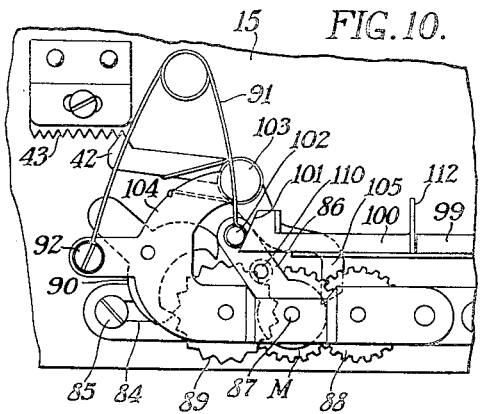
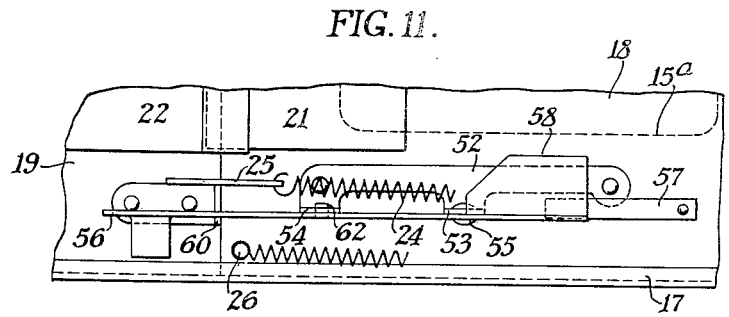
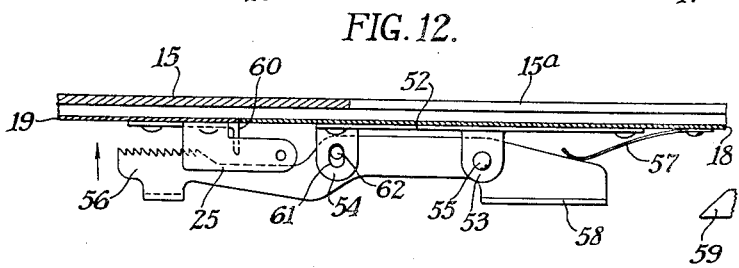
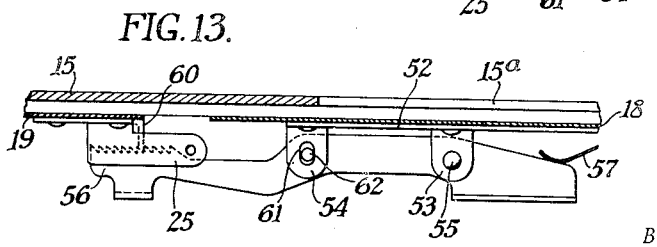
HENRY O. DROTNING
INVENTOR

2,358,061

UNITED STATES PATENT OFFICE 2,358,061

CAMERA SHUTTER

Henry O. Drotning, Rochester, N. Y., assignor to Eastman Kodak Company, Rochester, N. Y., a corporation of New Jersey Application March 28, 1941, Serial No. 385,671

22 Claims. (Cl. 95—55)

This invention relates to photography and, more particularly, to shutters for photographic cameras. One object of my invention is to provide a shutter of the type requiring setting before exposure in which separate high speed and low speed mechanisms are provided and in which the slow speed mechanism includes a power operated latch mechanism for closing the shutter after a predetermined lapse of time. Another object of my invention is to provide a camera shutter with high speed and low speed dials, these dials including an interlocking mechanism which will permit the operation of only one dial at a time and which will prevent the camera adjusting mechanism from being damaged from improper operation of the camera. Another object of my invention is to provide a slow speed mechanism unit which can be readily adjusted to give the desired predetermined time and to provide a mechanism which can be readily replaced if desired without affecting the remainder of the camera shutter. Other objects will appear from the following specification, the novel features being particularly pointed out in the claims at the end thereof.

Coming now to the drawings in which like reference characters denote like parts throughout;

Fig. 1 is a fragmentary front elevation showing parts of a camera shutter constructed in accordance with and embodying a preferred form of my invention;

Fig. 2 is a front plan view of a camera suitable for use with a shutter of the type shown in Fig. 1, this view showing the shutter adjusting dials;

Fig. 3 is an end view of the camera shown in Fig. 2;

Fig. 4 is a fragmentary elevation of parts of my improved shutter mechanism but with the camera shutter in an open position for making an exposure;

Fig. 5 is a view similar to Figs. 1 and 4 but with the shutter in a closed position which it assumes after an exposure has been made;

Figs. 6 and 7 are fragmentary views of the interlock between the shutter setting dials, Fig. 6 showing the low speed dial locked against movement, and Fig. 7 showing the high speed dial locked against movement;

Fig. 8 is a fragmentary section through the shutter and showing the exposure frame of the camera;

Fig. 9 is a fragmentary view showing a portion of the shutter mechanism and including the slow speed motor;

Fig. 10 is a view similar to Fig. 9 but with the slow speed controlling motor in a set position;

Fig. 11 is a fragmentary elevation of a portion of the high speed shutter plate control mechanism; and Figs. 12 and 13 are fragmentary part sectional views showing the high speed shutter plate control in two different positions, in Fig. 12 in an inoperative position, and in Fig. 13 in an operative position to control the time of exposure through the width of a slot between the shutter members.

My invention consists briefly in providing a shutter in which there is a high speed mechanism controlled by a high speed dial and a low speed mechanism controlled by a low speed dial, there being an interlocking mechanism between the two dials to prevent one from being operated while the other is being used. In addition, my invention includes a motor operated latch for controlling the slow speeds of the shutter, this motor being adjustable by means of the slow speed dial.

When I refer to high speed and slow speed dials, I am including in the high speeds such exposures as are usually considered a short enough duration to hold the camera in the hand as, for instance, from $\frac{1}{25}$ to $\frac{1}{1000}$ of a second. I include in the slow speed mechanism such exposures as usually require a tripod or other camera support and, in the preferred embodiment of my invention, these speeds may consist of from $\frac{1}{10}$ of a second to 1 second. These two groups have been more or less arbitrarily selected and it would of course be possible to change the exposures by altering the mechanism of the shutter.

As indicated in Figs. 2 and 3, my invention may be applied to a camera 1, having a front wall 2, which may support the usual lens barrel 3 and objective 4. On the front wall 2 I prefer to mount a pair of shutter speed regulating dials 5 and 6 and to provide a bar 7 with a pointer 8 cooperating with the dial 5 and a pointer 9 cooperating with a dial 6. In the present embodiment of my invention, dial 5 is referred to as the high speed dial and dial 6 is referred to as the slow speed dial.

The top of the camera 10 may support a housing 11 which is shown as including a finder element 12 and range finder elements 13 and 14. The housing 11 may also support a film winding knob W and a film rewinding knob R. The camera above described, except for the speed setting dials, may be of any typical construction.

I prefer to provide a camera with a shutter of the focal plane type in which two shutter plates are used, one sliding after the other to make an exposure either through a slot between the two shutter plates or by permitting one plate to open the exposure aperture and the other plate to close the aperture after a predetermined time. Referring to Fig. 1, the camera mechanism plate 15 is shown as being removed from the camera and it supports a pair of spaced rails 16 and 17 on which a first shutter plate 18 and a second shutter plate 19 are slidably mounted as, for instance, upon a series of rollers or studs 20. Each shutter plate has a rearwardly extending portion 21 on plate 18 and 22 on plate 19 which are so shaped that they closely approach a film lying across the exposure aperture 23 schematically shown in broken lines in Fig. 1.

A spring means tends to move both shutter plates across the exposure aperture 23, this spring means consisting of an elongated spring member 24 attached at one end to a bracket 25 on the second shutter member 19 and attached at the other end to a stud 26 on the first shutter plate 18. Both of these members, the bracket 25 and the stud 26, may be attached to the same spring member 24 in which case the spring may encircle an adjusting sheave 27 or separate springs may be used if desired.

With the shutter parts in the position shown in Fig. 5, which is the position they assume after an exposure has been made, the first operation for making an exposure will be winding the film and setting the shutter. This may be done through the film winding knob 12 in any suitable manner as, for instance, is shown in an application for Automatic exposure mechanism for shutters, filed in the name of Joseph Mihalyi, Serial No. 312,399, filed January 4, 1940, now Patent No. 2,238,501, dated April 15, 1941. Reference may be had to this application for a detailed description of this part of the mechanism which forms no part of my present invention.

It is sufficient to indicate, referring to Fig. 5, that in winding the film by means of the knob 12, the mechanism shown in the Mihalyi application engages a lever 28 pivotally attached at 29 to the mechanism plate 15 causing this lever to swing in the direction shown by the arrow. This movement causes the cam surface 30 to engage a roller 31 on the shutter member 18 moving the shutter member to the left of Fig. 5 until the position shown in Fig. 1 is reached. In the position shown in Fig. 1 a bracket 32 carried by the shutter member 18 is engaged by latch member 33 in the form of a lever also pivoted upon the stud 29 and terminating in an arm 34 which lies beneath and may be operated by a shutter trigger 35 shown in Fig. 2. A spring 36 encircling the stud 29 and engaging an upstanding lug 37 on the lever 28 tends to move the lever to the position of rest shown in Fig. 5. There is also a second spring 38 encircling a screw 39 and having one end lying beneath the bent over flange 34 of the latch member 33. The function of this spring is to move the latch member 33 towards the other latch element 32 carried by the plate 18. This normally engages the latch elements and, in addition, holds the end of the arm 34 in a rest position against the shutter trigger 35. Thus, when the lever 28 is swung from the position of Fig. 5 to the position in Fig. 1, it not only moves the shutter member 18 to its set position, but, since the shutter member 19 is moved by the shutter member 18, it likewise moves the second shutter member to its set position.

In referring to the shutter members 18 and 19, I call the shutter member 18 the first shutter plate and the shutter member 19 the second shutter member because this is the order of their operation across the exposure aperture 23 in making an exposure.

There are two different latches which may engage and hold the shutter member 19 in a set position. One latch, which I refer to as the high speed latch, consists of a hook latch element 40 which may be positioned to engage a pin 41 carried by the shutter member 19. If this latch element is not to be used it may be held in the inoperative position shown in Fig. 1, as in this position of the parts a second latch element 42 is in position to engage a latch element 43 also carried by the shutter member 19.

The high speed mechanism latch element 40 is only used for exposures from $\frac{1}{25}$ to $\frac{1}{1000}$ of a second and this mechanism is adjusted by the setting dial 5. Since it is the same as the high speed mechanism of the Mihalyi application referred to above, it will only be briefly described. The latch element 40 is carried by a two-part lever, one part 44 carrying the latch element 40 and being pivoted upon a shaft 45. A second part 46 of the lever is mounted to move to and from the pivot 45 and on the end of the lever 46 there is an arm 47 having a downwardly extending cam 48 and a downwardly extending cam surface 49 adapted to contact with a pin 50 as indicated in Fig. 1 when the latch element 40 of the high speed mechanism is to be held out of its operative position as shown.

However, again referring to Fig. 1, after the arm 46 is moved by the dial member 5 to the left in this figure, it will be noticed that the cam surface 49 rides off of the pin 50 permitting the arm 46 to drop downwardly a distance sufficient to bring the latch element 40 into engagement with the pin 41, thus holding the shutter member 19 in its set position. Assuming that the shutter is set for $\frac{1}{100}$ of a second for instance, the latch elements 40 and 41 will be engaged and the latch elements 32 and 33 will be engaged. By depressing the shutter trigger 35 the latch element 33 releases element 32 and the shutter member 18 flies to the right with reference to Fig. 1 and, as soon as it is moved a short distance, flange 32 which also forms the latch element will strike the cam 48 (which has been moved much closer to the flange 32 than shown in Fig. 1 in setting the shutter for $\frac{1}{100}$ of a second), thus raising the arm 46 and rocking it about its pivot 45 causing the latch elements 40 and 41 to separate so that the shutter member 19 may follow the shutter member 18 with a slit between the two plates to make an exposure as this slit passes the exposure aperture 23. The mechanism supporting plate 15, as indicated in Fig. 4, is of course provided with an opening 15a, here shown the same size and shape as the exposure aperture 23 so that light rays may pass through the opening 15a through the slot between the shutter members 18 and 19 and through the exposure aperture 23 to a film lying there against.

In order to hold the slot between the shutter members 18 and 19 at a fixed width throughout the movement of these shutter members under a high speed mechanism, a ratchet latch structure, shown in Figs. 11 to 13, is employed. The shutter member 18 carries a bracket 52 which is provided with upstanding lugs 53 and 54. Lug 53 carries a pivot 55 supporting a toothed pawl 56, a spring 57 normally thrusting this pawl in the direction shown by the arrow in Fig. 12. A flange 58 is bent over from the end of this pawl and is positioned to engage a cam surface 59 as the shutter member 18 comes to rest, thus moving the pawl 56 against spring pressure to release a flange 60 carried by the shutter member 19.

The lug 54 includes a slot 61 and a pin 62 which limit the movement of the pawl in both directions. The operation of this device is as follows. When the shutter member 18 moves to the right as the shutter trigger 35 is released, the teeth of the pawl 56 ride past the upstanding flange 60 until such a time as the latch elements 40 and 41 separate, releasing the shutter member 19. Since the spring means for moving the shutter member 19 is adjusted so as to be slightly stronger than the spring means moving shutter member 18, the flange 60 will be held in engagement with one of the teeth 56 as the two shutter members move together to make an exposure. The slot between the shutter members will remain the same width until after the exposure is completed, at which time the flange 58 will ride up on the cam 59, releasing the multi-toothed pawl 56 from the flange 60, and permitting the shutters to reach their fully closed position, as shown in Fig. 5.

When, however, it is desired to use the slow speed mechanism, the dial 5 will be turned to the position shown in Fig. 2 in which the pointer 8 points to N on the dial indicating its neutral position and indicating the position shown in Fig. 7 in which the interlocking means, which will now be described, locks dial 5 and releases dial 6.

Dial 5 is carried by a shaft 64 on which there is mounted a disk 65 having a notch 66 which may be engaged by a plunger 67 when the dial 5 is in its neutral position. This plunger is carried by plate 68 having a pair of slots 69 through which studs 70 pass permitting a limited sliding movement. A spring 71 exerts a downward force upon member 68 and one end of the spring 72 applies a light friction to the edge 73 of the disk 65.

When the dial 5 is moved to the position shown in Fig. 1 the dial 6 may be moved from its neutral position shown in Fig. 2 to a position such as that shown in Fig. 7 in which the slow speed mechanism is brought into action. As indicated in Fig. 7, the slide 68 is provided with a plunger 74 opposite to plunger 67 and this plunger may ride on a disk 75 having a cut-out 76. Thus the dial 6 may be freely turned when the parts are in the Fig. 7 position so that a heart-shaped cam 77 on a shaft 78 carrying the disk 75 and the setting dial 6 may turn.

As the heart-shaped cam 77 turns, it engages oppositely disposed formings 79 on a lever 80 pivoted upon the lower stud 70, the lever 80 being provided with a fork 81 engaging a pin 82 of a slidable carriage 83 carrying the motor operated latch element 42. The carriage 83 is provided with slots 84 engaging studs 85 and may be moved through a range of movement illustrated in Fig. 1 wherein the longest exposure is produced—here one second—to the position shown in Fig. 5 in which the latch element 42 is inoperative because it extends beyond the end of the multi-toothed latch element 43. In this position the interlocking parts are as shown in Fig. 6.

It will be noticed in this figure that the plunger 67 rides on the periphery of disk 65 so that the high speed setting disk may be used for the high speeds and so that the slow speed control mechanism, which will now be described, will be in its inoperative position in which the slow speed setting disk 6 is latched against movement. This latch consists of the plunger 74 which lies in the cut-out 76 effectually holding the shaft 78 against movement. It is, therefore, impossible to actuate the high speed and slow speed mechanisms at the same time and it is impossible to damage the shutter mechanism through an attempt to operate it improperly. If an operator cannot turn the dial he wishes to, it is only necessary to move the opposite dial to its neutral position in which N lies opposite a pointer 8 or 9.

The slow speed mechanism includes a time controlling motor unit designated broadly as M. This consists of a spring driven oscillatable arm 86 which may turn with a shaft 87 connected to a gear train 88 and which preferably includes a star wheel 89 and a pallet 90 for controlling the speed of operation of the arm 86. The spring drive may consist of a hairpin spring 91 connected to a fixed stud 92 at one end and to the arm 86 at the other end, this spring constantly exerting a force in the direction shown by the arrow, Fig. 5, to turn the arm 86 in a clockwise direction.

The arm 86 is shown in its inoperative and unset position. Assuming that the dial 6 is turned for a 1 second exposure, the carriage 83 will be moved to the right to its full extent as shown in Fig. 1. In this position and in all other positions the heart-shaped cam engaging the spaced formings 79 definitely holds the carriage 83 by means of the pin 82 in a fixed or set position. Consequently, when the shutter is set by swinging the lever 28, the following movements will take place. Lever 28 carries an upstanding pin 93 engaging a slot or fork 94 in lever 95 pivoted at 96 to the mechanism plate 15 and carrying a stud 97 pivotally supporting a lever 98 which includes an end 99 which is positioned to contact with and move a short arm 100 to the left, this arm having a cam face 101 for engaging and moving a pin 102 carried by the arm 86, oscillating the arm about its pivot 87 and tensioning the spring 91.

As soon as the shutter is set, lever 28 and the parts movable with it return to the inoperative position as in Fig. 1. Thus, the arm 99 is withdrawn from its setting position and lies out of the path of movement of the parts in making an exposure. The slide 100 which is moved by the end 99 of the lever 97 is provided with a turned down flange 106 and includes a slot slidable about the pin 107 so that this member too may be moved by a spring 108 out of the path of the oscillatable arm 86. This is desirable because it permits the arm 86 to accurately control the speed of the shutter because the arm always moves at the same rate of speed under the influence of spring 91 and the gear retard 88. A lug 112 on member 100 is engaged by pin 26 on shutter member 18, and as long as the latter is in latched or set position (Fig. 1) the cam face 101 holds arm 86 against movement by spring 91, because member 100 cannot be pulled toward the right by spring 108 until the latch 33 is raised by button 35.

When the first shutter member 18 is released and flies across to the position of Fig. 4 under the pull of spring 24, the spring 108 instantly pulls member 100 back also. The spring 91 then drives the gear train 88 as fast as pallet 90 will permit, and when a pin 110 in arm 86 strikes the tail 105 of latch 42, the latter is turned on its pivot 103 and is freed from the toothed member 43. The second shutter 19 is then immediately pulled across the opening 23 by the spring 24 and the shutter is closed.

The length of time the spring motor (gear train) 88 runs before the pin 110 trips latch 42 depends entirely on the position of the carriage 83, and this is determined by the heart-shaped cam 77. Thus, if this cam is in the position of Fig. 6, the carriage is in its extreme left-hand position and the arm 86 will be moved by the slide member 100 a very little distance, so that pin 110 will strike the part 105 almost immediately after the button 35 is depressed. If, however, the carriage 83 is in the extreme right position (the cam 77 having been turned 180 degrees from Fig. 6), the arm 86 will be moved to the left by slide 100 to the greatest possible extent and it will, therefore, take an appreciable time for the gear train to move the arm 86 far enough to enable the pin 110 to trip arm 105 and release latch 42.

Each time the slow speed exposure dial is turned, the slidable carriage 83 will move the time-controlling motor unit to a different position until the neutral position of the dial moves the carriage to the Fig. 5 position in which it is inoperative. The slower the exposure, the greater the movement of the carriage toward the right in Figs. 1 and 5. The faster the exposure, the further the movement of the carriage toward the left up to the point where the latch element 42 will no longer engage the multitoothed latch element 43. If the dial 6 is set to say $\frac{1}{10}$ of a second, the latch element 42 will engage one of the teeth toward the left of the multi-toothed latch element 43.

From the above description it will be seen that I have provided a shutter having a high speed and a low speed latch element for the second shutter member 19 and that I have provided an interlock which permits only one of these latches with its accompanying mechanism to function. The slow speed mechanism is actually a constant speed motor which moves a latch tripping arm at a constant speed.

The degree of setting this arm before an exposure can be made determines the duration of the exposure, since, if the arm is set to its maximum distance, here shown as slightly less than 90°, a prolonged exposure will be made and if the arm is only set through two or three degrees of movement a comparatively short timed exposure will be made.

In the present embodiment of my invention the high speed settings here shown, as from $\frac{1}{25}$ to $\frac{1}{1000}$ of a second, are made by starting the first shutter member and permitting it to move until a slot of predetermined width is formed between it and the second shutter member 19 and then causing both shutter plates to move across the exposure aperture with the slot held at its predetermined width to make an exposure. The slot used for a $\frac{1}{1000}$ of a second is very narrow and the slot used for $\frac{1}{25}$ of a second is comparatively wide, both slots being taken care of by the teeth on the multi-toothed pawl 56 and the flange 60 on the second shutter member.

When making a slow speed exposure through the slow speed mechanism controlled by the dial 6, the first shutter member 18 uncovers the aperture and the second shutter member 19 covers up the aperture again. Thus, the first shutter member usually completes its movement before movement of the second shutter member takes place and the time interval between these two movements in opening and closing the shutter is controlled solely by the time control motor.

I claim:

1. In a camera shutter of the type requiring setting before an exposure can be made, the combination with a pair of shutter members constituting a first and a second shutter member, of a mounting on which the shutter members may move one after the other, a latch for the first shutter member, a pair of latches for the second shutter member, one for high and the other for slow speed exposures, and a time control mechanism cooperating with the slow speed latch, and means for releasing the slow speed latch solely through the time control mechanism, said time control mechanism including a spring driven unit movably mounted with respect to the camera, and a manually movable member for adjusting the position of the time control unit to and from an operative position for slow exposures, said manually controlled member also including connections with the latches for the second shutter member to operatively position only one latch at a time according to the type of exposure required.

2. In a camera shutter of the type including a pair of slidable shutter plates which may be released one after the other to make an exposure and including settable spring means for moving the shutter plates, the combination with a latch for the first shutter plate, and a second latch for the second plate, the second latch comprising a movable element, an element on the shutter plate to cooperate therewith, a spring motor pivotally carrying the movable element for moving the movable element, a motor spring included in the spring motor, means for setting the motor spring and the spring means for moving the shutter plates, an adjustable carriage carrying the spring motor on which said motor may be moved to vary the tension placed on the motor spring in setting the shutter.

3. In a shutter of the type requiring setting before an exposure can be made and including a high speed mechanism, a slow speed mechanism, shutter blades adapted to be actuated by said mechanisms, said shutter having in combination, a pair of control dials, one for the high speed mechanism and one for the low speed mechanism, an interlock between the two control dials so positioned that only one control dial may be moved at one time.

4. In a shutter of the type requiring setting before an exposure can be made and including a high speed mechanism, a slow speed mechanism, shutter blades adapted to be actuated by said mechanisms, said shutter having in combination, a pair of control dials, one for the high speed mechanism and one for the low speed mechanism, an interlock between the two control dials comprising a movable disk on each dial shaft, a notch in each disk, a slidable member movable between the two disks and locking one disk against movement when said bar is held in a disk notch by the periphery of the opposite disk whereby only one setting dial may be used at one time.

5. In a shutter of the type requiring setting before an exposure can be made and including a high speed mechanism, a slow speed mechanism, shutter blades adapted to be actuated by said mechanisms, said shutter having in combination, a pair of control dials, one for the high speed mechanism and one for the low speed mechanism, an interlock between the two control dials comprising a movable disk on each dial shaft, a notch in each disk, a slidable member movable between the two disks and locking one disk against movement when said bar is held in a disk notch by the periphery of the opposite disk whereby only one setting dial may be used at one time said slow speed mechanism including a spring motor time control gearing, a shutter setting member, a movable carriage for moving the gearing into and out of the path of the setting member, and means connected to the slow speed dial and to the carriage for moving the spring motor control gearing.

6. In a camera shutter of the type including a pair of successively moving shutter plates adapted to cross an exposure aperture, a first shutter plate and a second shutter plate, and including spring means for moving the shutter plates to make an exposure, the combination with a high speed mechanism, of a slow speed mechanism, a pair of latches, one for the high speed mechanism and the other for the slow speed mechanism, both latches positioned to engage latch elements on the second shutter plate, dial means for selecting an exposure time, connections between the dial means and high and low speed latches for engaging only the latch necessary for the selected exposure.

7. In a camera shutter of the type including a pair of successively moving shutter plates adapted to cross an exposure aperture, a first shutter plate and a second shutter plate, and including spring means for moving the shutter plates to make an exposure, the combination with a high speed mechanism, of a slow speed mechanism, a pair of latches, one for the high speed mechanism and the other for the slow speed mechanism, both latches positioned to engage latch elements on the second shutter plate, the low speed latch on the second shutter plate including a plurality of tooth-like notches each adapted to be engaged by the low speed latch, and manually operable means for selecting the proper latch for the selected time of exposure.

8. In a camera shutter, the combination with a support, of rails mounted therein, a first and a second shutter plate mounted to slide on the rails, spring means for moving the shutter plates, a latch for holding the first plate in position for exposure, a second latch for holding the second plate in position for an exposure, a time control motor for the second latch including gearing and an oscillatable arm, a hairpin spring connected to one end to the arm and at the other end to a fixed abutment for driving the arm in one direction, means for moving the arm in an opposite direction in setting the shutter, thereby tensioning the hairpin spring and a shutter release for releasing the first shutter plate latch and the time control motor whereby the second latch may be released a predetermined time after the first shutter plate latch is released.

9. In a camera shutter of the type requiring setting before an exposure can be made, the combination with a pair of shutter members constituting a first and a second shutter member, of a mounting on which said shutter members may move one after the other, a spring connected to and tending to move each shutter member when the shutter is set, a latch for holding the first shutter member in a set position, a pair of latches for holding the second shutter in a set position, and including latch engaging elements carried by the shutter, one of said latches lying in the path of the first shutter member to be released thereby for a fast exposure, a spring driven time control mechanism including a setting mechanism positioned to be set in setting the shutter, the other of said latches including an arm positioned for release by said spring driven time control mechanism for releasing the second shutter for slow exposures, and means for moving the spring driven time control mechanism bodily into an inoperative position with respect to the second shutter member.

10. In a camera shutter of the type requiring setting before an exposure can be made, the combination with a pair of shutter members constituting a first and a second shutter member, of a mounting on which said shutter members may move one after the other, a spring connected to and tending to move each shutter member when the shutter is set, a latch for holding the first shutter member in a set position, a pair of latches for holding the second shutter in a set position and including latch engaging elements carried by the shutter, one of said latches lying in the path of the first shutter member to be released thereby for a fast exposure, a spring driven time control mechanism including a setting mechanism positioned to be set in setting the shutter, the other of said latches including an arm positioned for release by said spring driven time control mechanism for releasing the second shutter for slow exposures, and a manually adjustable member interconnected with the two latch elements for the second shutter member for selecting one of the two latches in accordance with the selected exposure.

11. In a camera shutter of the type requiring setting before an exposure can be made, the combination with a pair of shutter members constituting a first and a second shutter member, of a mounting on which said shutter members may move one after the other, a spring connected to and tending to move each shutter member when the shutter is set, a latch for holding the first shutter member in a set position, a pair of latches for holding the second shutter in a set position and including latch engaging elements carried by the shutter, one of said latches lying in the path of the first shutter member to be released thereby for a fast exposure, a spring driven time control mechanism including a setting mechanism positioned to be set in setting the shutter, the other of said latches including an arm mounted upon the time control mechanism and connected therewith to be released thereby, and a movable dial, connections between the dial and the latch elements for the second shutter for selecting the latch to be used in accordance with the exposure desired.

12. In a camera shutter of the type requiring setting before an exposure can be made, the combination with a pair of shutter members constituting a first and a second shutter member, of a mounting on which said shutter members may move one after the other, a spring connected to and tending to move each shutter member when the shutter is set, a latch for holding the first shutter member in a set position, a pair of latches both adapted to be moved to and from a position for holding the second shutter in a set position and including latch engaging elements carried by the shutter, one of said latches lying in the path of the first shutter member to be released thereby for a fast exposure, a spring driven time control mechanism including a setting mechanism positioned to be set in setting the shutter, the other of said latches including an arm, a pivotal mount for the arm carried by the time control mechanism, a movable carriage carrying the time control mechanism, and means for manually moving the carriage and its pivoted arm to and from an operable position in which said latch arm may engage a latch element carried by the shutter, said means also moving the latch lying in the path of movement of the first shutter member so that only one latch at a time may be operatively positioned with respect to the second shutter member.

13. In a camera shutter of the type requiring setting before exposure and including a pair of shutter plates constituting a first and a second shutter plate which may be released one after the other for making an exposure, the combination with a latch for the first shutter plate, a first latch for the second shutter plate, a second latch for the second shutter plate including two elements, one a pawl and the other a multi-toothed ratchet, one element carried by the shutter plate, a movably mounted timing motor, the other latch element carried by the motor, means for moving the motor for altering the duration of exposures to positions in which the latch elements of the second latch may engage, and for moving the motor to an inoperative position in which the latch elements may not engage, said means also moving the first latch for the second shutter plate into an operative position relative to the second shutter plate when the second latch for said second shutter plate is moved so that the elements do not engage.

14. In a camera shutter of the type requiring setting before exposure and including a pair of shutter plates which may be released one after the other for making an exposure, the combination with a latch for the first shutter plate, a first latch for the second shutter plate, a second latch for the second shutter plate including two elements, one a pawl and the other a multi-toothed ratchet, one element carried by the shutter blade, a movably mounted timing motor, the other latch element carried by the motor, means for moving the motor for altering the duration of exposures to positions in which the latch elements of the second latch may engage, and for moving the motor to an inoperative position in which the latch elements of the second latch may not engage, a pivotal mount for the first latch for the second shutter on which it may move to and from an operative position, and means for moving the first latch to and from an operative position.

15. In a camera shutter of the type requiring setting before exposure and including a pair of shutter plates which may be released one after the other for making an exposure, the combination with a latch for the first shutter plate, a first latch for the second shutter plate, a second latch for the second shutter plate including two elements, one a pawl and the other a multi-toothed ratchet, one element carried by the shutter blade, a movably mounted timing motor, the other latch element carried by the motor, means for moving the motor for altering the duration of exposures to positions in which the latch elements of the second latch may engage, and for moving the motor to an inoperative position in which the latch elements of the second latch may not engage, a pivotal mount for the first latch for the second shutter on which it may move to and from an operative position, and means for moving the first latch to and from an operative position, and interlocking mechanism between the first and second latch operating means for moving one latch to an inoperative position when the other latch is moved to an operative position.

16. In a camera shutter of a type including a pair of slidable shutter plates which may be released one after the other to make an exposure and including settable spring means for moving the shutter plates, the combination with a latch for the first shutter plate, a second latch for the second shutter plate, the second latch comprising a movable latch element and a latch element carried by the shutter plate, a spring motor timer pivotally carrying the movable latch element, a motor spring included in the spring motor, a lever pivotally carried by the shutter for placing the shutter spring under tension, an adjustable carriage carrying the spring motor and the movable latch element on which these elements may be moved to vary the position of the spring motor relative to the setting lever whereby the amount of tension applied to the spring motor by the setting lever may be varied.

17. In a camera shutter of the type including a pair of shutter plates slidably mounted on a support, and a spring means for moving the shutter plates, the combination with a shutter setting mechanism including pivoted levers, a position of rest for said levers, a spring normally holding said levers in said position of rest, a first shutter plate, a latch for holding the shutter plate in a set position, a second shutter plate, a latch for holding the second shutter plate in a set position including a pivoted element, a time controlling motor unit, a spring for driving said unit, a pivoted arm carried by said unit for setting said spring, whereby said spring motor may move said pivoted latch element holding said shutter plate in a set position, means for moving said arm to tension said spring motor unit, said means also being positioned to set said shutter plates in position for an exposure.

18. In a camera shutter of the type employing two shutter plates constituting a first shutter member and a second shutter member, and a high and a low speed mechanism for operating the shutter plates and including a settable spring means for moving the shutter plates including, in combination, a time controlling motor unit comprising a slow speed mechanism and including a power spring, an oscillatable arm connected to said power spring and movable in one direction by said spring, a gear retard to determine the speed of movement of the oscillatable arm under the influence of said spring, a latch comprising two elements, one a pivoted lever operatively connected to the spring motor to control the slow speed mechanism and operable by the oscillatable arm thereof, the other latch element carried by the second shutter member, a lever for setting the shutter spring for the shutter members and for turning the oscillatable arm of the spring motor, a latch for the first shutter member, a trigger for releasing the latch of the first shutter member to make an exposure, said first shutter member lying in the path of and preventing movement of the oscillatable arm of the spring motor whereby release of the first shutter member may release the spring motor which in turn will move the second shutter latch member after a predetermined time.

19. In a camera shutter of the type including a pair of slidable shutter plates forming a first shutter plate and a second shutter plate which may be released one after the other to make an exposure and including settable spring means for moving the shutter plates, the combination with a first latch positioned to hold the first shutter plate in a set position, a second and a third latch, one movably mounted with respect to the other, both latches being adapted to alternately hold the second shutter plate in a set position, means for moving either the second or the third latch to an inoperative position in which said latch may not contact with the second shutter plate while in a set position while simultaneously operatively positioning the third or the second latch into a second shutter plate engaging position, a spring driven time control mechanism, means carried thereby for releasing the third latch engaging the second shutter plate, a release for the second latch for the second shutter plate operable by the first shutter plate, a pivoted arm movable to set the shutter plates against the spring means and means carried by the pivoted arm for setting the time control mechanism as the shutter is set by the pivoted arm.

20. In a camera shutter of the type including a pair of slidable shutter plates forming a first shutter plate and a second shutter plate which may be released one after the other to make an exposure and including settable spring means for moving the shutter plates, the combination with a first latch positioned to hold the first shutter plate in a set position, two latches constituting a second latch and a third latch, one movably mounted with respect to the other, either latches being adapted to hold the second shutter plate in a set position, means for moving either the second or the third latch to an inoperative position in which said latch may not contact with the second shutter plate while in a set position and at the same time moving the opposite latch, the third or second latch into an operative position for engaging the second shutter plate, a spring driven time control mechanism, means carried thereby for releasing the third latch for the second shutter plate, a pivoted arm for releasing the second latch, said arm being movable by the first shutter plate, a pivoted arm movable to set the shutter plates against the spring means and means carried by the pivoted arm for setting the time control mechanism as the shutter is set by the pivoted arm, said means including an arm movable through a fixed path to contact with and set the time controlled mechanism, a movable carriage carrying the time control mechanism and the third latch for the second shutter plate, and an adjusting member for moving the carriage to and from the arm movable through a fixed path to vary the contact of the setting arm with the time control motor and consequently the degree of setting the motor.

21. In a camera shutter of the type including a first and a second slidable plate and including settable spring means for moving the shutter plates, the combination with means for releasing the shutter plates one after the other to make an exposure including a first latch to engage the first shutter plate when in a set position, a trigger for releasing said latch, a pair of latches either of which may engage the second shutter plate when in a predetermined position, means for operatively positioning only one latch of the pair of latches at one time for engagement with the second shutter plate, a spring motor time control mechanism for operating one of said pair of latches after a predetermined time interval, a setting means for bodily moving said motor control mechanism with respect to its latch for varying the predetermined time interval of said last-mentioned latch, and a release for the other of said pair of latches adapted to engage the second plate operable with the first slidable plate whereby the second slidable plate may be released through movement of the first slidable plate.

22. In a camera shutter of the type including a first and a second slidable plate and including settable spring means for moving the shutter plates, the combination with means for releasing the shutter plates one after the other to make an exposure including a first latch to engage the first shutter plate when in a set position, a trigger for releasing said latch, a pair of latches either of which may engage the second shutter plate when in a predetermined position, means for operatively positioning only one latch of the pair of latches at one time for engagement with the second shutter plate, a spring motor time control mechanism for operating one of said pair of latches after a predetermined time interval, a setting means for bodily moving said motor control mechanism with respect to its latch for varying the predetermined time interval of said last-mentioned latch, and a release for the other of said pair of latches adapted to engage the second plate operable with the first slidable plate whereby the second slidable plate may be released through movement of the first slidable plate, the said release operable with the first slidable plate including abutments carried by the first slidable plate to contact with and release either the first latch for the second shutter plate or the second latch for the second shutter plate according to which latch is operatively positioned by said setting means.

HENRY O. DROTNING.